(12) United States Patent
Nakamura et al.

(10) Patent No.: US 6,515,631 B1
(45) Date of Patent: Feb. 4, 2003

(54) GLASS PANE WITH FUNCTIONAL FILM AND PROCESS PRODUCING SAME

(75) Inventors: Isao Nakamura, Mie (JP); Mizuki Nishi, Mie (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/635,647

(22) Filed: Aug. 10, 2000

(30) Foreign Application Priority Data

Aug. 17, 1999 (JP) .......................................... 11-230230

(51) Int. Cl.⁷ ................................................ H01Q 1/32
(52) U.S. Cl. .................... 343/704; 343/713; 427/163.1; 156/102; 219/203
(58) Field of Search ................................ 343/704, 713; 427/163.1, 165; 428/210; 156/102; 65/60.1; 219/522, 203; H01Q 1/32

(56) References Cited

U.S. PATENT DOCUMENTS

| | | | | |
|---|---|---|---|---|
| 2,197,601 A | * | 4/1940 | Wolaver ...................... | 343/713 |
| 2,944,926 A | * | 7/1960 | Gaiser .......................... | 33/713 |
| 4,830,876 A | | 5/1989 | Dietrich et al. ............... | 427/96 |
| 6,075,490 A | * | 6/2000 | Sakaguchi et al. .......... | 343/704 |

FOREIGN PATENT DOCUMENTS

| | | |
|---|---|---|
| EP | 0 355 998 | 2/1990 |
| EP | 0 662 457 | 7/1995 |
| EP | 0 818 561 | 1/1998 |
| JP | A 6-40252 | 2/1994 |
| JP | A 7-330379 | 12/1995 |
| JP | A 9-30836 | 2/1997 |
| JP | A 9-156962 | 6/1997 |
| JP | A 10-212137 | 8/1998 |
| JP | 11-71137 | 3/1999 |
| JP | 11-130471 | 5/1999 |

* cited by examiner

*Primary Examiner*—Michael C. Wimer
(74) *Attorney, Agent, or Firm*—Crowell & Moring LLP

(57) ABSTRACT

The invention relates to a glass pane including (a) a glass substrate having first and second major surfaces opposed to each other, (b) a functional film formed on the first major surface of the glass substrate, and (c) a conductive wire formed on the functional film. This glass pane is produced by a process having the sequential steps of (a) applying a coating liquid to the first major surface of the glass substrate, thereby forming thereon a first precursory film; (b) subjecting the coated glass substrate to a first baking at a first temperature of 550–620° C., thereby turning the first precursory film into a second precursory film; (c) printing a metal-containing paste on a part of the second precursory film, thereby forming thereon a precursory conductive wire; and (d) subjecting the coated glass substrate to a second baking at a second temperature of 600–670° C. which is higher than the first temperature, thereby turning the second precursory film and the precursory conductive wire into the functional film and the conductive wire, respectively. The second major surface of the glass substrate has a depression at a position corresponding to the conductive wire. This depression is made to have a depth not greater than 1 μm by the process. Therefore, the glass pane can be suitably used as an automotive rear window pane.

22 Claims, 1 Drawing Sheet

GLASS PANE WITH FUNCTIONAL FILM AND PROCESS PRODUCING SAME

BACKGROUND OF THE INVENTION

The present invention relates to a glass pane with a functional film and a conductive wire for providing a function of antifogging and/or antenna, and a process for producing the glass pane. In fact, the conductive wire is formed on a part of the functional film.

In recent years, there have been proposed automotive glass panes with various functional films such as color films for providing heat shielding, ultraviolet shielding, privacy and the like.

Japanese Patent Unexamined Publication JP-A-7-330379 discloses a color, transparent body having a transparent substrate, a color film formed thereon and a transparent protective film.

This color film contains (1) an oxide of at least one metal selected from the group consisting of Ti, Si, Zr, Ta, Sn and Zn, as a main component thereof, and (2) fine particles of metal and/or metal oxide, which are dispersed therein. JP-A-9-30836 discloses a glass pane with a light shielding film, and this film is prepared by applying a coating liquid containing an inorganic pigment ($CuO$, $Fe_2O_3$ and $Mn_2O_3$) and a silica sol (i.e., silica-precursor-containing sol). JP-A-9-156962 discloses a composition for forming a metal oxide film. This composition contains a metal salt and an alkanolamine. JP-A-6-40252 discloses an automotive glass pane having a portion through which the light emitted from a high-mounted stop lamp is transmitted. This portion is designed to have a higher visible light transmittance. U.S. Pat. No. 6,075,490, corresponding to JP-A-10-212137, discloses an automotive glass pane having a heat-shielding film formed on its inner side. This film is partially removed or modified to increase the visible light transmission therethrough. A conductive wire is formed on the heat-shielding film for providing a function of antenna and/or anti-fogging.

SUMMARY OF THE INVENTION

It is an object of the present invention to provide a glass pane with a functional film and a conductive wire, which is capable of providing an undistorted image or view taken through the glass pane.

According to the present invention, there is provided a glass pane comprising (a) a glass substrate having first and second major surfaces opposed to each other; (b) a functional film formed on the first major surface of the glass substrate by a wet method, the functional film comprising at least one oxide; and (c) a conductive wire prepared by printing a metal-containing paste on the functional film. The second major surface of the glass substrate has a depression at a position corresponding to the conductive wire, and this depression has a depth not greater than 1 μm. It is needless to say that the second major surface of the glass substrate may have only a slight depression, that is, the depth being a positive depth slightly greater than 0 μm.

According to the present invention, there is provided a process for producing the glass pane. This process comprises (a) applying a coating liquid to the first major surface of the glass substrate, thereby forming thereon a first precursory film; (b) subjecting the coated glass substrate to a first baking (preliminary baking) at a first temperature of 550–620° C., thereby turning the first precursory film into a second precursory film; (c) printing a metal-containing paste on a part of the second precursory film, thereby forming thereon a precursory conductive wire; and (d) subjecting the coated glass substrate to a second baking (main baking) at a second temperature of 600–670° C. which is higher than the first temperature, thereby turning the second precursory film and the precursory conductive wire into the functional film and the conductive wire, respectively. With this process, it is possible to adjust the above-mentioned depression to having a depth not greater than 1 μm. Therefore, the image or view taken through the glass pane becomes undistorted. For example, even when the glass pane is used as an automotive rear window glass inclined at an angle of 45 degrees or less to horizontal, the rear image or view taken by the driver from the rear-view mirror through the rear window glass becomes undistorted. This can bring the driver safety and comfort.

DESCRIPTION OF THE PREFERRED EMBODIMENTS

Figure 1:
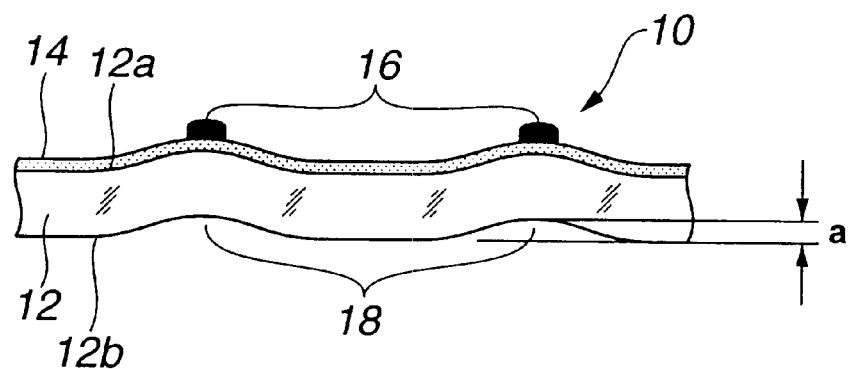
FIG. 1 is a sectional view showing a part of a glass pane according to a preferred embodiment of the present invention.

FIG. 1 shows a glass pane 10 according to a preferred embodiment of the present invention. This glass pane 10 has a glass substrate 12, a functional film 14 formed on a first major surface 12a of the glass substrate 12, and a conductive wire 16 formed on the functional film 14. A second major surface 12b of the glass substrate 12 may have a depression 18 at a position corresponding to the conductive wire 16. According to the present invention, however, it is possible to adjust the depression 18 to having a depth "a" not greater than 1 μm. As stated above, the second major surface 12b of the glass substrate 12 may have no such depression.

The inventors have unexpectedly found that the image taken through a conventional glass pane not according to the present invention, which has a similar construction as that of the glass pane according to the present invention, may be distorted by a depression formed on an uncoated side of the conventional glass pane. We further unexpectedly found that this depression at a position corresponding to a conductive wire of the conventional glass pane is caused by distortion or deformation of a glass substrate, since there is a difference in the degree of thermal contraction between a first portion, on which the conductive wire has been formed, and a second portion, on which it has not been formed. According to the present invention, the above-mentioned first baking is conducted prior to the printing of the metal-containing paste, in order to relax or release the distortion of the glass substrate. This distortion is caused by the thermal contraction of the functional film. By conducting the first baking, the degree of distortion of the glass substrate of the produced glass pane can be unexpectedly small. In fact, it becomes possible to adjust the above-mentioned depression to having a depth of 1 μm or less. With this, it becomes possible to produce a glass pane which is capable of providing an undistorted image or view taken therethrough. In fact, the depth of the depression can be measured by using a commercial surface configuration measuring device, as described hereinafter. This depth "a" is a distance between the second major surface 12b of the glass substrate 12 and the bottom of the depression 18 (see FIG. 1).

It is preferable that the conductive wire of the invention has a function of anti-fogging and/or antenna. The glass pane according to the invention can suitably be used as an automotive rear window glass fixed at an angle of 45 degree or less to horizontal. It is usual to arrange the coated side of the glass pane on the inner side of an automobile. The use of the glass pane is not particularly limited. It can be used for a decorative window of building, an industrial glass and the like.

In the above-mentioned process, it is optional to conduct a bending and/or tempering operation at the same time when the second baking is conducted.

As stated above, the first baking is conducted at a first temperature of 550–620° C. For example, in case of producing a tempered glass, it is preferable to conduct the first baking at the first temperature of about 571–620° C. for about 5–30 minutes. In case of producing a laminated glass, it is preferable to conduct the first baking at the first temperature of about 550–600° C. for about 5–30 minutes. The period of time of the first baking depends on the thickness of the glass substrate. Therefore, it is preferable to conduct the first baking for a longer time, as the glass substrate becomes greater in thickness. By conducting the first baking, the first precursory film contracts into the second precursory film. Therefore, after the second baking, it becomes possible to get a small difference in distortion between a first portion of the functional film, on which the conductive wire has been formed, and a second portion of the functional film, on which it has not been formed. With this, it is possible to adjust the depression to having a depth of 1 $\mu$m or less.

The second temperature of the second baking is higher than the first temperature of the first baking. For example, in case of producing a tempered glass, it is preferable to conduct the second baking at the second temperature of about 620–670° C. for about 1–3 minutes. In case of producing a laminated glass, it is preferable to conduct the second baking at the second temperature of about 600–620° C. for about 3–15 minutes. The period of time of the second baking also depends on the thickness of the glass substrate. For example, in case of producing a tempered glass, the second baking time may be about the product of the thickness of the glass substrate expressed in millimeter and 40 seconds. For instance, the second baking time may be 80 seconds, if the thickness of the glass substrate is 2 mm (2×40=80).

The coating liquid for forming the functional film is not particularly limited as long as it is in the form of liquid. It is particularly preferably a sol used in a sol-gel process. The coating liquid contains a raw material of at least one oxide formed by baking. The raw material can arbitrarily selected depending on the purpose and the use of the functional film. For example, the functional film can be a heat shielding film, an ultraviolet shielding film, a hydrophilic, anti-fogging film, an electromagnetic shielding film, a non-reflective film, a radio transmissive film, a conductive film or a decorative film by suitably selecting the raw material. It is optional to add an additive(s) such as a coloring agent. It is preferable that the coating liquid (sol) contains an alkoxide(s) of at least one element selected from Si, Ti, Zr, Sn, Zn and Ta. This alkoxide may be one in which alkoxy groups have been partially replaced with other alkoxy or alkyl groups or ligands such as diketone groups. If a silicon alkoxide is contained in the coating liquid, a functional film made of $SiO_2$ is formed. This film is improved in strength and chemical durability. Furthermore, the refractive index of $SiO_2$ is as small as 1.45. Therefore, the total refractive index of the functional film is made to be low. Consequently, it becomes possible to suppress the light reflection from the functional film. Therefore, the functional film preferably contains $SiO_2$ as a main component thereof. Examples of the silicon alkoxide are tetraethoxysilane (TEOS), methyltriethoxysilane, tetra-n-butoxysilane, tetramethoxysilane, tetrapropoxysilane, methyltrimethoxysilane, ethyltrimethoxysilane, and ethyltriethoxysilane. Similar examples of other alkoxides of metals (e.g., Ti, Zr, Sn, Zn and Ta) can also be used. In case of containing an alkoxide in the coating liquid, it is preferable to add an inorganic acid such as hydrochloric acid, nitric acid or sulfuric acid as a hydrolysis catalyst of the alkoxide. The coating liquid preferably further contains a solvent that is capable of dissolving an alkoxide or metal salt. Examples of the solvent are alcohols such as methanol, isopropyl alcohol and ethanol, diols such as ethylene glycol oligomer, polyethylene glycol, propylene glycol oligomer and hexylene glycol, water, cellosolve, and carbitols. In case of producing a functional film having a certain color, it is possible to add a first, second and/or third liquid to the coating liquid. The first liquid is a liquid in which an oxide(s) of at least one metal selected from Cu, Cr, Mn, Fe, Co, Ni, Zn, V, Ti, Al and the like is dispersed. The second liquid is a liquid containing a metal salt(s) of the at least one metal. The third liquid is a liquid in which fine particles of a metal selected from Au, Pt, Pd, Rh, and Ag are dispersed. Examples of the metal salt for the second liquid are nitrates, acetates, carbonates, chelate compounds, hydrochlorides and the like. Of these, nitrates are preferably used since they are cheap in price and easy to handle. The coating liquid may further contain other additives such as thickener. The method for applying the coating liquid is not particularly limited. It is possible to use a wet method such as dip coating, flow coating, spin coating, spraying, reverse roller coating, flexography, screen printing or the like.

As stated above, the first baking is conducted at the first temperature (550–620° C.) at which glass is not softened. In other words, the first temperature is preferably as high as possible within a range where glass is not softened. The period of time of the first baking is preferably from 5 to 30 minutes. The first temperature and the period of time of the first baking may vary depending on the type and the thickness of the glass substrate. If the first temperature is lower than 550° C. and/or the period of time is shorter than 5 minutes, the depression formed on the second major surface of the glass substrate may have a depth of greater than 1 $\mu$m. If the first temperature is higher than 620° C. and/or the period of time is longer than 30 minutes, the glass substrate may be distorted overall due to permanent deformation remaining therein. If the first baking is conducted by passing the coated glass substrate placed on a ring mold through a heating furnace, the coated glass substrate after the first baking may be warped in a manner that the coated side becomes concave, due to the difference in coefficient of contraction between the first precursory film and the glass substrate. If this warping happens, the produced glass pane may provide a distorted image taken therethrough. Thus, it is preferable to conduct the first baking by passing the coated glass substrate placed on a flat plate-like member through a heating furnace in a manner to expose the coated side. With this, it becomes possible to prevent the above warping.

After annealing following the first baking, it is preferable to cut the coated glass substrate to get a desired shape and then print a metal-containing paste on the film. It is, however, optional to cut the glass substrate and then apply a coating liquid for forming the functional film. After the first baking, the a metal-containing paste can be printed by screen printing or the like. The composition of this paste is not particularly limited. For example, silver paste can be used therefor. It is optional to add other additives to silver paste. The function of the conductive wire is not particularly limited. For example, the conductive wire can be configured to have a function of anti-fogging and/or antenna. The conductive wire serves as a heating wire to have a function of anti-fogging.

By conducting the second baking, the second precursory film is turned into the functional film. If the coating liquid (sol) contains an alkoxide(s) of at least one element selected from Si, Ti, Zr, Sn, Zn and Ta, the obtained functional film contains an oxide(s) of at least one element selected therefrom. The functional film produced by conducting the second baking is strongly secured to the surface of the glass substrate and is improved in abrasion resistance, chemical resistance and the like.

The glass substrate can be selected from various glass types such as soda-lime glass, aluminosilicate glass and borosilicate glass. The glass substrate may be colored or colorless so long as it is transparent. It is preferable to use a colorless, transparent glass in order to make the produced glass pane have a gray color.

The visible light transmittance of the glass pane can be arbitrarily adjusted. For example, if the glass pane is used as an automotive window glass for providing privacy, it is preferable that the glass pane has a visible light transmittance of 40% or lower and a haze value of 0.5% or lower. The adjustment of the visible light transmittance of the glass pane can be conducted by suitably selecting the type and composition of pigment, the size of the pigment particles, the ratio of the pigment to the oxide (i.e., matrix of the functional film), the thickness of the functional film and the like. The thickness of the functional film can be adjusted by suitably selecting the rate and temperature of the application of the coating liquid, the solvent composition of the coating liquid, the viscosity of the coating liquid, and the like.

The following nonlimitative example is illustrative of the present invention.

EXAMPLE

At first, a glass substrate (float glass) having a thickness of 3.5 mm, a length of 1,200 mm and a width of 650 mm was washed with water using an automated washer. Then, the back surface of the glass substrate was masked with a masking tape.

Separately, an inorganic pigment solution in which 18.5% of an inorganic pigment of $CuO$, $Fe_2O_3$ and $Mn_2O_3$ is dispersed in ethanol was mixed with a silica-precursor-containing sol in which 16.0 wt % of a silica precursor in terms of $SiO_2$ is dispersed in a mixture of methanol and ethanol. With this, there was prepared a coating liquid in which the weight ratio of the inorganic pigment to the silica precursor in terms of $SiO_2$ is 1.00 and the total solid matter content is 17.3 wt %.

Then, the glass substrate was dipped into the coating liquid in an atmosphere having a humidity of 45% and a temperature of 21° C. Then, the glass substrate was withdrawn at a rate of 1 mm/s, thereby forming a first precursory film on the glass substrate. Then, the masking tape was removed from the glass substrate. After that, the coated glass substrate was placed on a flat plate-like member in a manner to expose the coated side. Then, the first baking was conducted by putting the coated glass substrate in a heating furnace at 600° C. for 20 minutes to turn the first precursory film into a second precursory film, followed by annealing at a rate of 40° C. per minute. After annealing, the coated glass substrate was cut to have a predetermined size and shape for automotive rear window glass, followed by chamfering.

Then, a commercial conductive silver paste was printed on the second precursory film by screen printing to form thereon anti-fogging and antenna wires having a predetermined pattern. Then, the coated glass substrate was put for 2.5 minutes in a furnace for bending and tempering, while the furnace temperature was maintained at a temperature of 670–700° C., thereby conducting the second baking and the bending and tempering treatments. During this, the maximum temperature of the glass substrate was 630° C.

The obtained glass pane had a uniform functional film having a gray color. The thickness of the functional film was measured, and the result was 330 nm. This measurement was conducted by using a surface configuration measuring device, Dektak3030 (trade name) of Sloan Co. In fact, a part of the functional film was removed by a cutter immediately after its formation to expose a stepped portion having an edge of the functional film. Then, the thickness of the functional film was measured by conducting a contact scanning of a needle over this stepped portion.

The depth of a depression formed on the uncoated side of the glass substrate at a position corresponding to the conductive wire was measured by using a precision surface configuration measuring device of SURF-CORDER SE-30H (trade name) type of Kosaka Kenkyusho Co. with magnifications of X10,000 in a vertical direction and X4 in a horizontal direction. With this measurement, the depth was found to be 0.45 $\mu$m. This is satisfactorily small.

Figure 2:
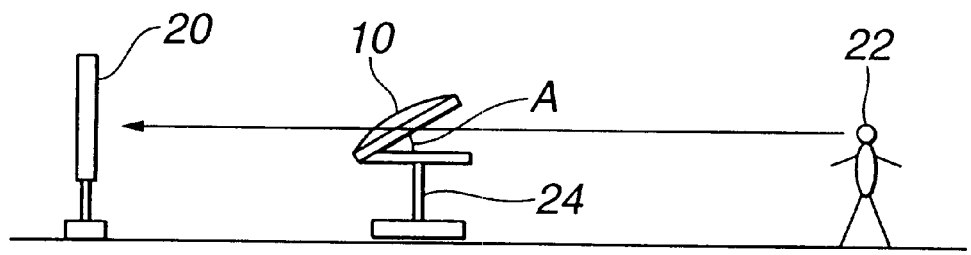
FIG. 2 is a schematic side view showing a test for evaluating the degree of the distortion of the image of a zebra board observed by a viewer through the glass pane.
Figure 3:
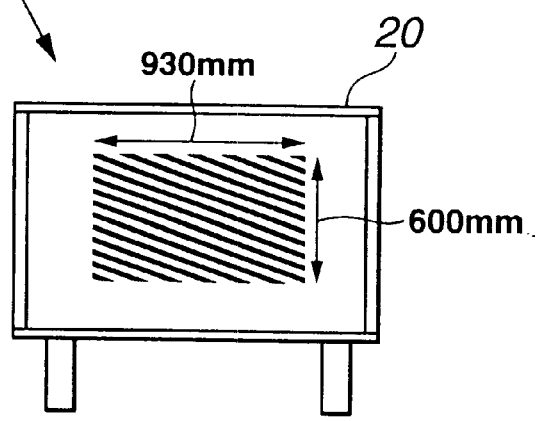
FIG. 3 is an elevational front view of the zebra board.

As shown in FIG. 2, a test for evaluating the degree of the distortion of the image of a zebra board 20 observed by a viewer 22 through the glass pane (test sample) 10 was conducted, as follows. As shown in FIG. 3, the zebra board 20 had thereon parallel stripes at intervals of 18 mm inclined at an angle of 20 degrees to horizontal, each stripe having a width of 18 mm. A support 24 was placed at a position 5 m away from the zebra board 20. Then, the glass pane 10 was placed on a support 24 in a manner to hold the glass pane 10 at an angle A of 20 degrees to horizontal. This angle of 20 degrees is the same as that of an actual automotive rear window glass. Then, as shown in FIG. 2, an image of the zebra pattern (parallel stripes) of the zebra board 20 was observed through the glass pane 10 by the naked eyes of the viewer 22 standing 3 m away from the support 24. This image was not distorted in the observation. Therefore, the glass pane was judged to be satisfactory for this test.

What is claimed is:

1. A glass pane comprising:
    a glass substrate having first and second major surfaces opposed to each other;
    a functional film formed on said first major surface of said glass substrate by a wet method, said functional film comprising at least one oxide; and
    a conductive wire prepared by printing a metal-containing paste on said functional film,
    wherein said second major surface of said glass substrate has a depression at a position corresponding to said conductive wire, said depression having a depth greater than 0 and less than or equal to 1 $\mu$m.

2. A glass pane according to claim 1, wherein said conductive wire has at least one function selected from the group consisting of anti-fogging and antenna.

3. A glass pane according to claim 1, which is an automotive rear window pane secured to an automotive body and inclined at an angle of at most 45 degrees to horizontal.

4. A glass pane according to claim 1, which is a tempered glass.

5. A glass pane according to claim 1, which is used in a laminated bent glass.

6. A glass pane according to claim 1, wherein said at least one oxide of said functional film is selected from the group consisting of silicon oxide, titanium oxide, zirconium oxide, tin oxide, zinc oxide and tantalum oxide.

7. A glass pane according to claim 6, wherein said at least one oxide of said functional film comprises silicon oxide.

8. A glass pane according to claim 1, which has a transmittance of 40% or lower and a haze value of 0.5% or lower for providing privacy.

9. A process for producing a glass pane, said glass pane comprising:

a glass substrate having first and second major surfaces opposed to each other;

a functional film formed on said first major surface of said glass substrate by a wet method, said functional film comprising at least one oxide; and a conductive wire prepared by printing a metal-containing paste on said functional film, wherein said second major surface of said glass substrate has a depression at a position corresponding to said conductive wire, said depression having a depth greater than 0 and less than or equal to 1 μm, said process comprising:

applying a coating liquid to said first major surface of said glass substrate, thereby forming thereon a first precursory film;

subjecting the coated glass substrate to a first baking at a first temperature of 550–620° C., thereby turning said first precursory film into a second precursory film;

printing a metal-containing paste on a part of said second precursory film, thereby forming thereon a precursory conductive wire;

subjecting the coated glass substrate to a second baking at a second temperature of 600–670° C. which is higher than said first temperature, thereby turning said second precursory film and said precursory conductive wire into said functional film and said conductive wire, respectively.

10. A process according to claim 9, wherein, when the coated glass substrate is subjected to said second baking, the coated glass substrate is subjected to at least one of bending or tempering.

11. A process according to claim 9, wherein said first baking is conducted at a first temperature of 571–620° C. for about 5–30 minutes.

12. A process according to claim 9, wherein said first baking is conducted at a first temperature of about 550–600° C. for about 5–30 minutes.

13. A process according to claim 9, wherein said first baking is conducted for a longer time as said glass substrate becomes greater in thickness.

14. A process according to claim 11, wherein said second baking is conducted at a second temperature of 620–670° C. for about 1–3 minutes.

15. A process according to claim 12, wherein said second baking is conducted at a second temperature of 600–620° C. for about 3–15 minutes.

16. A process according to claim 9, wherein said second baking is conducted for a longer time as said glass substrate becomes greater in thickness.

17. A process according to claim 9, wherein said coating liquid is a sol used in a sol-gel process.

18. A process according to claim 17, wherein said sol comprises an alkoxide of at least one element selected from the group consisting of Si, Ti, Zr, Sn, Zn and Ta.

19. A process according to claim 18, wherein said sol comprises a silicon alkoxide.

20. A process according to claim 17, wherein said sol comprises an inorganic acid.

21. A process according to claim 18, wherein said sol further comprises an oxide of at least one metal selected from the group consisting of Cu, Cr, Mn, Fe, Co, Ni, Zn, V, Ti, and Al.

22. A process according to claim 18, wherein said sol further comprises particles of a metal selected from the group consisting of Au, Pt, Pd, Rh and Ag.

* * * * *